April 23, 1963
C. W. DONALS
3,086,408
PORTABLE ANGLE DRILL JIG
Filed Oct. 10, 1961
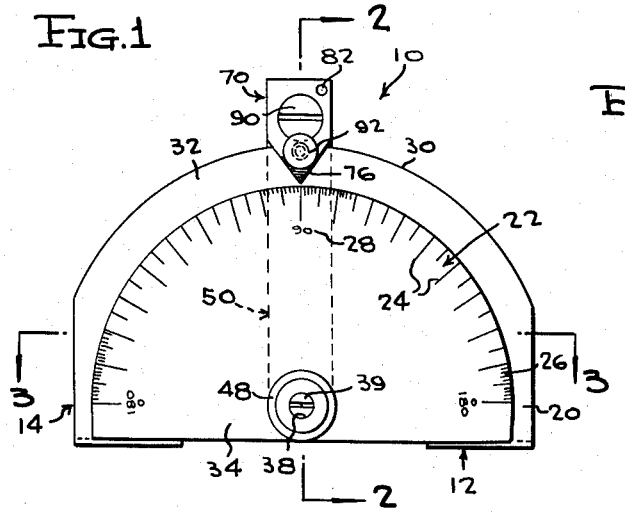
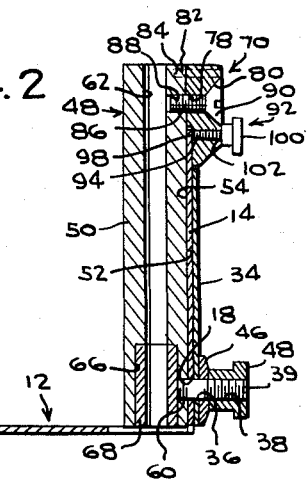
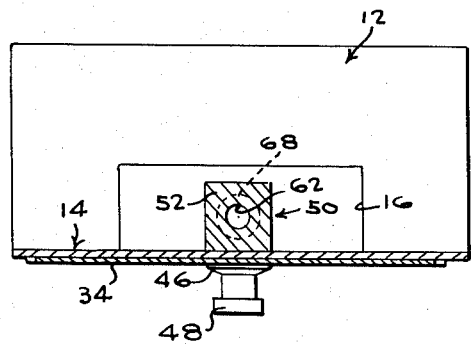
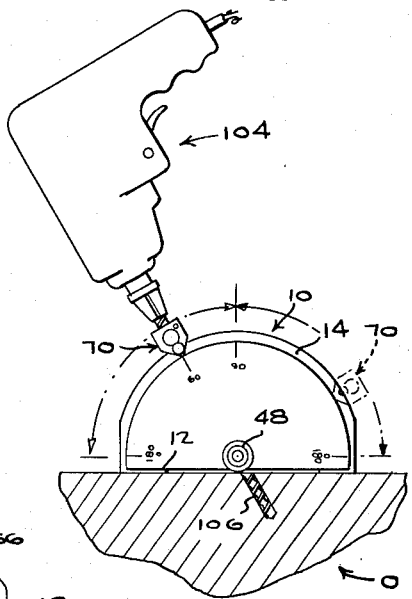
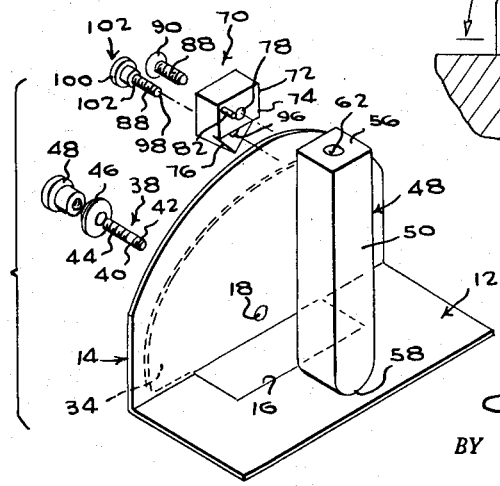
INVENTOR.
CARL W. DONALS
BY
McMorrow, Berman & Davidson
ATTORNEYS 3,086,408
PORTABLE ANGLE DRILL JIG
Carl W. Donals, Redwood City, Calif.
(2707 S.E. Salmon, Portland, Oreg.)
Filed Oct. 10, 1961, Ser. No. 144,094
7 Claims. (Cl. 77—62)

This invention relates to a novel portable angle drill jig, especially but not exclusively for power hand drills.

The primary object of the invention is the provision of a compact, practical, efficient, and easily used device of the kind indicated, for general use in boring holes at different determined angles, and for special use where space is at a premium or the drill must be operated in a confined and difficult to reach area.

Another object of the invention is the provision of a simple hand-held device of the character indicated above, which is composed of a small number of uncomplex and easily assembled parts, and which can be made in rugged and well-finished forms, at relatively low cost.

Other important objects and advantageous features of the invention will be apparent from the following description and the accompanying drawings, wherein, for purposes of illustration only, a specific form of the invention is set forth in detail.

In the drawings:

FIGURE 1 is a side elevation of a device of the present invention, showing the same adjusted to drill at right angles to the surface of an object to be drilled;

FIGURE 2 is a vertical transverse section taken on the line 2—2 of FIGURE 1;

FIGURE 3 is a horizontal section taken on the line 3—3 of FIGURE 1;

FIGURE 4 is an exploded rear perspective view of the device; and,

FIGURE 5 is a schematic view showing the device adjusted to drill at 60° relative to the surface of an object, shown in section, a power drill having its bit engaged through the device and in the object.

Referring in detail to the drawings, wherein like numerals designate like parts throughout the several views, the illustrated device, generally designated 10, comprises a flat base plate 12 having extending along its forward edge, and preferably integral therewith, an upstanding semi-circular protractor plate 14. The base plate 12 has a longitudinally elongated, centered clearance opening 16 extending along and opening to its forward edge.

The protractor plate 14 has, intermediate its ends, and located near to and spaced upwardly from the base plate 12, a centered hole 18. The front surface 20 of the protractor plate 14 is provided with a 180° protractor scale 22 which is concentric with the hole 18, and has graduation marks 24, including subdividing marks 26, and numerals 28 indicating, for example, 90° marks. The scale 22 is concentrically and downwardly spaced from the arcuate upper edge 30 of the protractor plate, whereby an arcuate bearing area 32 is provided between the scale and the upper edge 30. As shown in the drawings, the scale 22 may be located around the periphery of a protractor scale disc 34 which is suitably secured to the front side of the protractor plate 14, the disc 34 having a centered hole 36 which is registered with the protractor plate hole 18.

A screw 38 has a smooth intermediate portion 40, a short threaded rear end portion 42, and a relatively long threaded forward portion 44, and a screwdriver slot 39 in its forward end. A tapered washer 46 and a thumb nut 48 are threaded on the forward portion 44, with the smooth portion 40 located in the holes 18 and 36 and the rear threaded portion 42 extending behind the protractor plate 12, and threaded into a drill bit holder 48, The drill bit holder 48 comprises an elongated solid block 50, having a flat forward side 52, to bear slidably against the rear side 54 of the protractor plate 12. The block 50 has a flat, squared upper end 56, and a transverse semi-circular lower end 58, adapted to bear upon the upper surface of the base plate 12. At a determined distance above its lower end, the block 50 is provided with a threaded hole 60 which receives the threaded rear end portion 42 of the screw 38.

The drill bit holder block 50 is provided with an axial bore 62, which extends to the upper and lower ends, and which opens, at its lower end, to the clearance opening 16. The bore 62 has a counterbore 66, at its lower end, in which is suitably secured a tubular bearing bushing 68. The bit holder 50 is rotatable, on the axis of the screw 38, relative to the protractor plate 14 and the scale 22, and is adapted to be clamped in a selected position, by means of a clamp assembly 70.

The clamping assembly 70 comprises a rectangular solid block 72 having a rear surface 74. A pendant, inverted isosceles triangular pointer 76, on the underside of the block 72, is narrower than the block and is forwardly offset, relative to the rear surface 74, to the extent of the thickness of the protractor plate 14, as shown in FIGURE 2. The block 72 is provided with a centered threaded bore 78 extending therethrough, and preferably provided, at its forward end, with a countersink 80. A positioning pin 82, positioned at one side of the bore 78, extends rearwardly from the block 72, and engages in a socket 84, provided in the forward side of the protractor plate 14. The drill bit holder 50 is provided, adjacent to its upper end with a threaded bore 86, which extends between its bore 62 and its forward side, with which the clamping block bore 78 is registered, and a screw has a shank 88 threaded through the bores 78 and 86, with its head 90 engaged in the countersink, whereby the clamping assembly 70 is mounted on the bit holder 50, with its pointer 76 bearing against the bearing area 32 of the protractor plate 14.

A clamping screw 92 has a threaded shank 94 threaded rearwardly through a centered threaded bore 96, provided in the pointer 76, and has a rear end 98 adapted to jam against the bearing area 32 on the forward side of the protractor plate 14, for locking the drill bit holder at a desired angle, relative to the scale 22, with the pointer aligned with the related graduation mark of the scale. The screw 92 has a thumb knob 100 on its forward end, which has a rear end 102 which is adapted to jam against the bearing area 32 of the protractor plate 14.

In use and operation, the jig is held in one hand with the base plate pressed flat against the surface of an object O to be drilled, and, the drill bit holder 50 having been adjusted and locked in the desired position, a power drill 104 is held in the other hand and its drill bit 106 inserted downwardly in the bore of the holder 50, and the drill operated to drill into the object O, at the predetermined angle.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A portable angle drill jig comprising a work-engaging base, a member fixed to and extending at right angles from the base, a dill bit holder pivoted adjacent its lower end on said member, said member having a protractor scale centered with respect to the pivotal axis of the holder, and clamping means spaced from the pivotal axis of the holder and acting between the holder and said member for retaining the holder in a selected position, said holder being a radially elongated block having an axial drill bit receiving bore extending therethrough and having an arcuate lower end bearing upon the base.

2. A portable angle drill jig comprising a work-engaging base, a member fixed to and extending at right angles from the base, a drill bit holder pivoted on said member, said member having a protractor scale centered with respect to the pivotal axis of the holder, and clamping means acting between the holder and said member for retaining the holder in a selected position, said holder being a radially elongated block having an axial drill bit receiving bore extending therethrough, said drill bit holder being located at one side of said member, a pointer carried by the holder and positioned at the opposite side of the said member, and a protractor scale on said opposite side of the member to which said pointer points.

3. A portable angle drill jig comprising a base plate, an upstanding semi-circular protractor plate fixed to and rising from the base plate and having an arcuate upper edge, said protractor plate having forward and rear sides, a protractor scale on said forward side concentrically spaced from the upper edge of the protractor plate, a radially elongated drill bit holder pivoted on the protractor plate at the center of the scale and bearing against the rear side of the protractor plate, the space on the forward side of the protractor plate between the scale and the upper edge of the protractor plate being a bearing area, said holder having an axial bore extending therethrough, and said base plate having a clearance opening to which the lower end of the holder bore opens, and a clamping assembly mounted on the holder and having a pointer traversing said scale, and a clamping screw traversing the assembly and engageable with said bearing area for locking the holder in a selected position.

4. A portable angle drill jig comprising a base plate, an upstanding semi-circular protractor plate fixed to and rising from the base plate and having an arcuate upper edge, said protractor plate having forward and rear sides, a protractor scale on said forward side concentrically spaced from the upper edge of the protractor plate, a radially elongated drill bit holder pivoted on the protractor plate at the center of the scale and bearing against the rear side of the protractor plate, the space on the forward side of the protractor plate between the scale and the upper edge of the protractor plate being a bearing area, said holder having an axial bore extending therethrough, and said base plate having a clearance opening to which the lower end of the holder bore opens, and a clamping assembly mounted on the holder and having a pointer traversing said scale, and a clamping screw traversing the assembly and engageable with said bearing area for locking the holder in a selected position, said holder bore having a tubular bushing in its lower end.

5. A portable angle drill jig comprising a base plate, an upstanding semi-circular protractor plate fixed to and rising from the base plate and having an arcuate upper edge, said protractor plate having forward and rear sides, a protractor scale on said forward side concentrically spaced from the upper edge of the protractor plate, a radially elongated drill bit holder pivoted on the protractor plate at the center of the scale and bearing against the rear side of the protractor plate, the space on the forward side of the protractor plate between the scale and the upper edge of the protractor plate being a bearing area, said holder having an axial bore extending therethrough, and said base plate having a clearance opening to which the lower end of the holder bore opens, and a clamping assembly mounted on the holder and having a pointer traversing said scale, and a clamping screw traversing the assembly and engageable with said bearing area for locking the holder in a selected position, and means pivoting the holder on the protractor plate comprising a screw having a smooth intermediate portion and threaded rear and forward portions, said protractor plate having a hole centered relative to the scale on which said smooth portion is engaged with the rear end portion of the screw threaded into the holder, a washer on the screw, and a knob threaded on said forward end portion of the screw and compressing the washer against the forward side of the protractor plate.

6. A portable angle drill jig comprising a base plate, an upstanding semi-circular protractor plate fixed to and rising from the base plate and having an acuate upper edge, said protractor plate having forward and rear sides, a protractor scale on said forward side concentrically spaced from the upper edge of the protractor plate, a radially elongated drill bit holder pivoted on the protractor plate at the center of the scale and bearing against the rear side of the protractor plate, the space on the forward side of the protractor plate between the scale and the upper edge of the protractor plate being a bearing area, said holder having an axial bore extending therethrough, and said base plate having a clearance opening to which the lower end of the holder bore opens, and a clamping assembly mounted on the holder and having a pointer traversing said scale, and a clamping screw traversing the assembly and engageable with said bearing area for locking the holder in a selected position, said clamping assembly comprising a block having an underside facing the upper edge of the protractor plate and a rear side bearing against the forward side of the protractor plate, said pointer being forwardly offset relative to the rear side of the block, means securing the block non-rotatably to the holder above the upper edge of the protractor plate, and a clamping screw threaded through the pointer and bearing against the bearing area of the protractor plate.

7. A portable angle drill jig comprising a base plate, an upstanding semi-circular protractor plate fixed to and rising from the base plate and having an arcuate upper edge, said protractor plate having forward and rear sides, a protractor scale on said forward side concentrically spaced from the upper edge of the protractor plate, a radially elongated drill bit holder pivoted on the protractor plate at the center of the scale and bearing against the rear side of the protractor plate, the space on the forward side of the protractor plate between the scale and the upper edge of the protractor plate being a bearing area, said holder having an axial bore extending therethrough, and said base plate having a clearance opening to which the lower end of the holder bore opens, and a clamping assembly mounted on the holder and having a pointer traversing said scale, and a clamping screw traversing the assembly and engageable with said clamping area for locking the holder in a selected position, said clamping assembly comprising a block having an underside facing the upper edge of the protractor plate and a rear side bearing against the forward side of the protractor plate, said pointer being forwardly offset relative to the rear side of the block, means securing the block non-rotatably to the holder above the upper edge of the protractor plate, and a clamping screw threaded through the pointer and bearing against the bearing area of the protractor plate, said securing means comprising a screw threaded through the block and threaded in the holder, and a positioning pin on the block at one side of the screw, the forward side of the holder having a socket in which said pin is engaged.

References Cited in the file of this patent
UNITED STATES PATENTS 1,207,717    Dartt ----------------- Dec. 12, 1916